United States Patent [19]

Pfaffenzeller et al.

[11] Patent Number: 4,736,516

[45] Date of Patent: Apr. 12, 1988

[54] STACKING DEVICE FOR OFFSET ROTOR LAMINATION STACKS OR THE LIKE

[75] Inventors: Willi Pfaffenzeller, Rimpar; Horst Betz, Zellingen, both of Fed. Rep. of Germany

[73] Assignee: Siemens Aktiengesellschaft, Berlin & Munich, Fed. Rep. of Germany

[21] Appl. No.: 896,163

[22] Filed: Aug. 13, 1986

[30] Foreign Application Priority Data

Aug. 13, 1985 [DE] Fed. Rep. of Germany ....... 3529050

[51] Int. Cl.⁴ ............................................ H01K 15/02
[52] U.S. Cl. ...................................... 29/732; 29/738; 414/27
[58] Field of Search ................. 29/732, 738, 736, 596, 29/598, 609; 414/27

[56] References Cited

U.S. PATENT DOCUMENTS 3,254,372 6/1966 Hofbauer .......................... 29/738 X
4,400,872 8/1983 Berges ................................. 29/598

FOREIGN PATENT DOCUMENTS 0875544 10/1981 U.S.S.R. ............................... 29/738

Primary Examiner—Carl E. Hall
Attorney, Agent, or Firm—Volker R. Ulbrich

[57] ABSTRACT

A stacking device is provided for offset lamination stacks. The stacking device has aligning pins mounted in a base plate obliquely to the supporting surface of the base plate in accordance with the offset of the lamination stack. The guide openings for the aligning pins are formed as insertion grooves which are machined from the outer circumferential surface of the base plate. The aligning pins inserted into the insertion grooves are finally fixed in position by means of a closure ring which encloses the base plate on its outer circumferential surface and lies adjacent to the aligning pins.

3 Claims, 1 Drawing Sheet

STACKING DEVICE FOR OFFSET ROTOR LAMINATION STACKS OR THE LIKE

BACKGROUND OF THE INVENTION

This invention pertains to a stacking device for stacking small motor rotor laminations, and more particularly to a stacking device for offset rotor laminations.

In prior art devices, four holes are drilled in an appropriate base plate as guide openings. Cylindrical aligning pins are inserted into the holes and held in place, for example, by means of tapered ends expanded in a conical fashion. In the preparation of a stacking device for offset laminations with aligning pins attached obliquely to the supporting surface of the base plate in order to achieve the desired offset, great difficulties are encountered in drilling the guide openings obliquely. This is so because determining the position of the holes and thus the attachment of the aligning pins relative to the base plate must be performed from two planes. Since the aligning pins point in opposite directions, the slightest deviation of the holes of the base plate make the entire device unusuable. It will be appreciated that it would be highly desirable to provide a stacking device for the mechanical stacking of offset laminations in which the guide openings for the aligning pins are prepared in a simple manner and the obliquenesses of all the aligning pins required for the intended offset of the lamination stack can be insured with accuracy.

Accordingly, an object of the present invention is to provide a stacking device for the mechanical stacking of laminations.

Another object of the invention is to provide a stacking device for offset laminations in which the guide openings for the aligning pins are prepared in a simple manner.

Another object of the invention is to provide a stacking device for offset lamination where the obliqueness of aligning pins is accurate.

SUMMARY OF THE INVENTION

Briefly stated, in accordance with one aspect of the invention, a stacking device is provided for offset lamination stacks with aligning pins held by one end in guide openings of a base plate and other free ends of the aligning pins extending into grooves in laminations that are slipped onto the aligning pins and are stacked forming a lamination stack. Guide openings are formed radially from an outer circumferential surface of the base plate and form insertion grooves for the aligning pins.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
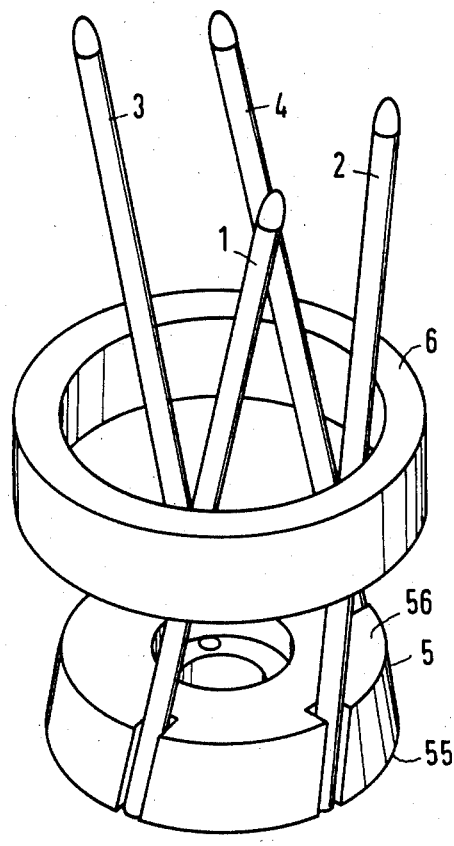
FIG. 1 is an exploded perspective representation of a stacking device acording to the present invention.

Referring to FIG. 1, a stacking device essentially consists of a base plate 5, aligning pins 1, 2, 3, 4 and a closure ring 6, which, when the stacking device is fully assembled, has its inner circumference adjacent to the outer circumference of the base plate 5 and adjacent to the aligning pins 1-4.

Figure 2:
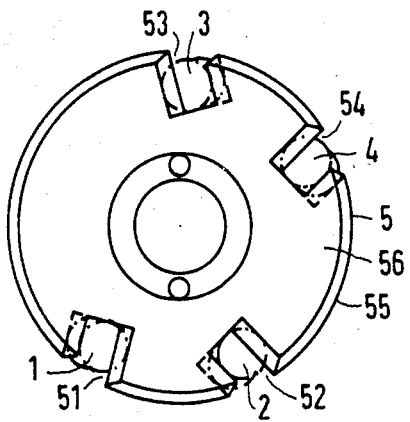
FIG. 2 is a diagrammatic top view illustrating the base plate of the stacking device of FIG. 1.

As FIG. 1 and FIG. 2 illustrate, insertion grooves 51, 52, 53, 54 are formed in the base plates to receive the aligning pins 1-4. They are formed in the base plate 5 from its outer circumferential surface, for example by mechanical grinding or milling. The aligning pins 1-4 are inserted from the bottom side 55 of the base plate 5 and fixed in place in a preliminary manner by wedging or clamping by means of their ends which are slightly expanded in a conical fashion with respect to the inside clearance of the insertion grooves 51-54. The closure ring 6 serves as the final guide securing the aligning pins 1-4 in place in the insertion grooves 51 of the base plate 5. The closure ring is pushed from the top side 56 over the outer circumferential surface of the base plate and has its inner surface adjacent to or pressing on the outer surface of the aligning pins 1-4, which are appropriately shaped and introduced into the insertion grooves 51-54.

Figure 3:
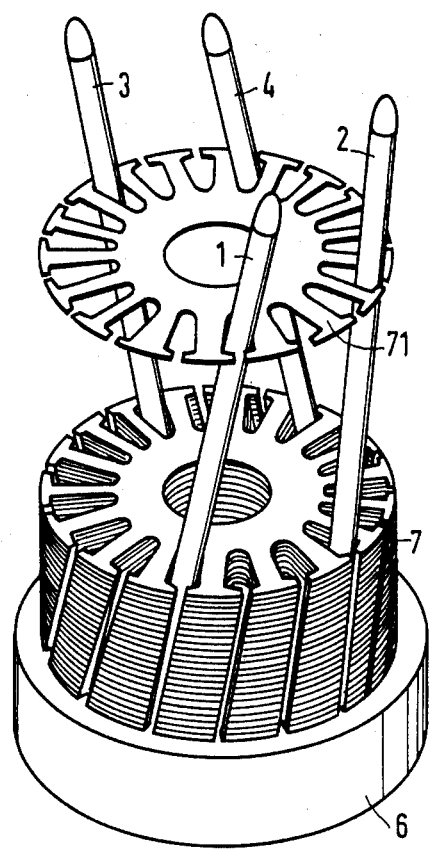
FIG. 3 illustrates the stacking device of FIG. 1 after its assembly and with a lamination stack partially stacked.

FIG. 3 shows the stacking device fully assembled with several individual laminations stacked and packed to form a partial lamination stack 7. The partial lamination stack 7 stacked in this manner is provided with an offset such that the grooves do not have their axes perpendicular to the top side 56 of the base plate 5, but have their axes running at a certain angle obliquely to the top side 56. The top part of FIG. 3 shows an individual plate 72 which is being slipped over the free ends of the aligning pins. The plate 71 is guided or pressed along the aligning pins, into the position provided in accordance with the offset, to the already stacked partial lamination stack below.

To ensure the correct guiding of the laminations along the aligning pins to provide a certain offset, on the one hand, and also to securely press the closure ring 6 over the entire height of the ends of the aligning pins which are inserted into the insertion grooves, it is necessary to adjust the radial depth of grinding or milling of the insertion grooves in accordance with the diameter of the cylindrical aligning pins. It is further provided in accordance with an embodiment of the invention that the base plate 5 and the closure ring 6 are made in the shape of a truncated cone with an inclination angle adjusted to the offset and thus to the oblique direction of the aligning pins. The inclination is visible in both FIG. 1 and FIG. 2 in the differing diameters of the top side 56 in relation to the bottom side 55 of the base plate.

It will now be understood that there has been presented a guide receptacle for the aligning pins which is distributed in a base plate with open insertion grooves for the aligning pins. The insertion grooves are formed from its outside diameter and the base plate is closed and, at the same time, the aligning pins are fixed inplace in the insertion grooves by the slipping of the closure ring over the base plate. The device makes it possible to transfer the design obliqueness for the aligning pins to the outer circumference of the base plate in a simple manner in the mechanical stacking of an offset lamination stack. And to grind in or mill in all the insertion grooves and thus to transfer to the aligning pins that are to be mounted in the insertion grooves a configuration in the correct and accurately maintained direction relative to one another and to the supporting surface of the base plate.

As will be evident from the foregoing description, certain aspects of the invention are not limited to the particular details of the examples illustrated, and it is therefor contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A stacking device for a lamination stack of offset laminations, the stacking device including aligning pins each held at one end in a base plate, the other ends being free to extend into grooves in laminations that are slipped onto the aligning pins, the laminations forming a lamination stack of offset laminations as the laminations are slipped onto the the aligning pins, the base plate comprising a plurality of insertion grooves for fixing the aligning pins in place, the insertion grooves being formed radially from an outer circumferential surface of the base plate and being closed on their radially outer sides by a closure ring enclosing the base plate and lying adjacent the aligning pins, the ring for securing the pins in place within the insertion grooves.

2. The stacking device of claim 1, wherein the insertion grooves extend over the entire height of the outer circumferential surface of the base plate.

3. The stacking device of claim 1 wherein the base plate and the closure ring are made in the shape of a truncated cone with an inclination angle adjusted to an inclination angle the same as the aligning pins allowing complete contact of the closure ring against the aligning pins.

* * * * *